United States Patent

Illing

[11] 3,934,851
[45] Jan. 27, 1976

[54] BUTTERFLY VALVE HAVING A SPLIT VANE

[75] Inventor: Henry Illing, Parksville, N.Y.

[73] Assignee: Kieley & Mueller, Inc., Middletown, N.Y.

[22] Filed: Dec. 12, 1973

[21] Appl. No.: 424,084

[52] U.S. Cl. ............... 251/248; 251/305; 251/212; 137/637.3
[51] Int. Cl.² ........................................ F16K 31/53
[58] Field of Search .......... 251/228, 248, 304, 305, 251/306, 307, 308, 160, 161, 212; 137/269, 637.3, 637.5, 599.2, 552.5, 595

[56] References Cited
UNITED STATES PATENTS

| | | | |
|---|---|---|---|
| 958,313 | 5/1910 | Riordan | 137/637.3 |
| 2,209,397 | 7/1940 | Gannestad | 137/637.3 |
| 2,412,918 | 12/1946 | Sladky | 137/269 |
| 2,706,492 | 4/1955 | Horland | 251/248 X |
| 2,755,818 | 7/1956 | Dietz | 137/637.3 |
| 3,070,345 | 12/1962 | Knecht | 251/212 |
| 3,633,626 | 1/1972 | Zirps et al. | 137/637.3 |

Primary Examiner—Henry T. Klinksiek
Attorney, Agent, or Firm—Kenyon & Kenyon Reilly Carr & Chapin

[57] ABSTRACT

The butterfly vane is constructed of two semi-circular parts, each of which pivots about a common longitudinal axis. One part is mounted on a shaft which is connected to a drive while the second part is mounted on a second shaft concentrically of the first shaft. The second shaft is driven in an opposite direction off the first shaft by a suitable transmission. The construction of the split vane and transmission is such that the closing torques are reduced to near zero eliminating the sharp torque gradients in throttling angles greater than 60°.

13 Claims, 7 Drawing Figures

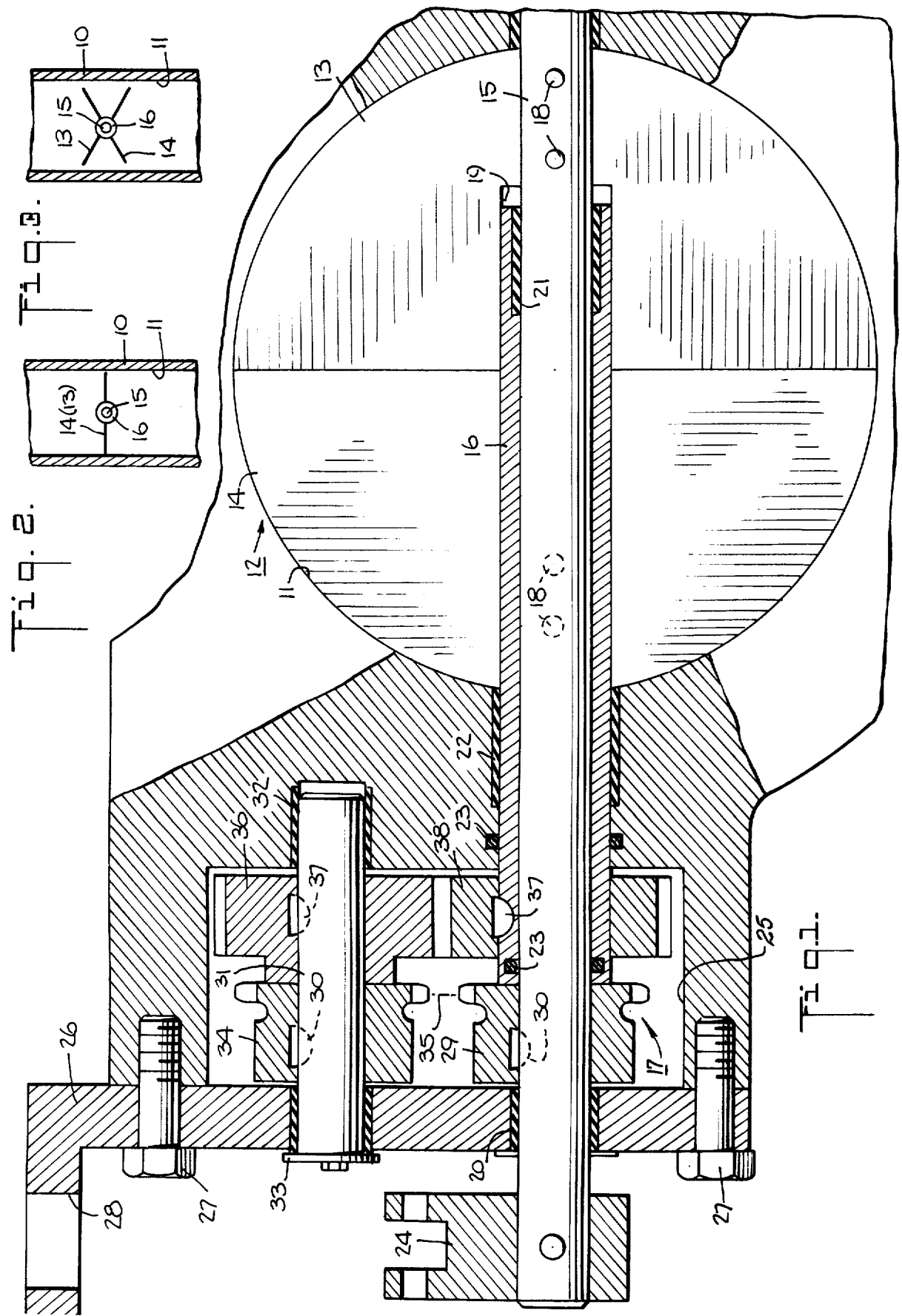

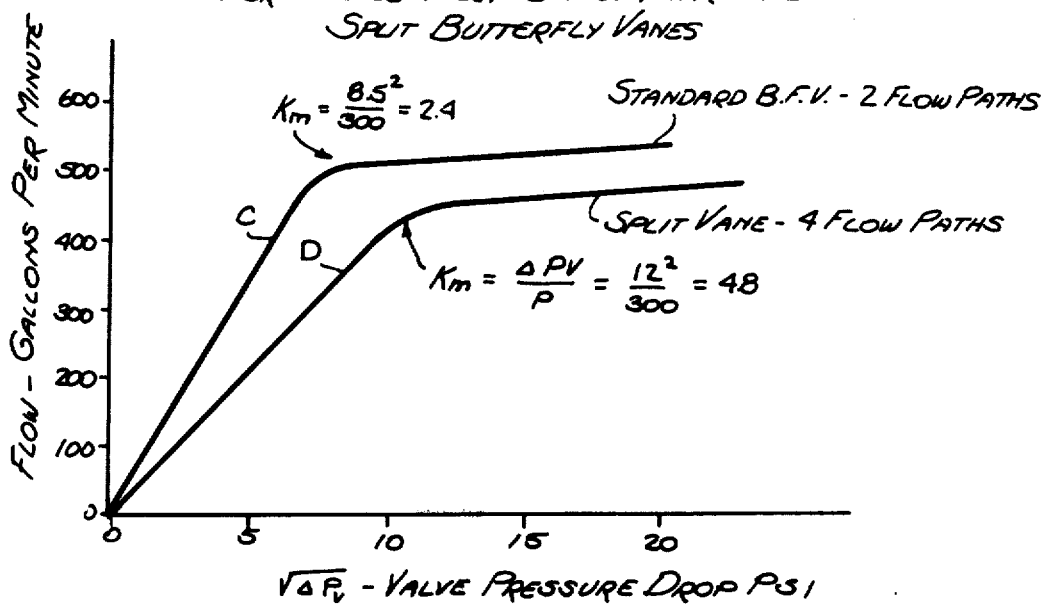
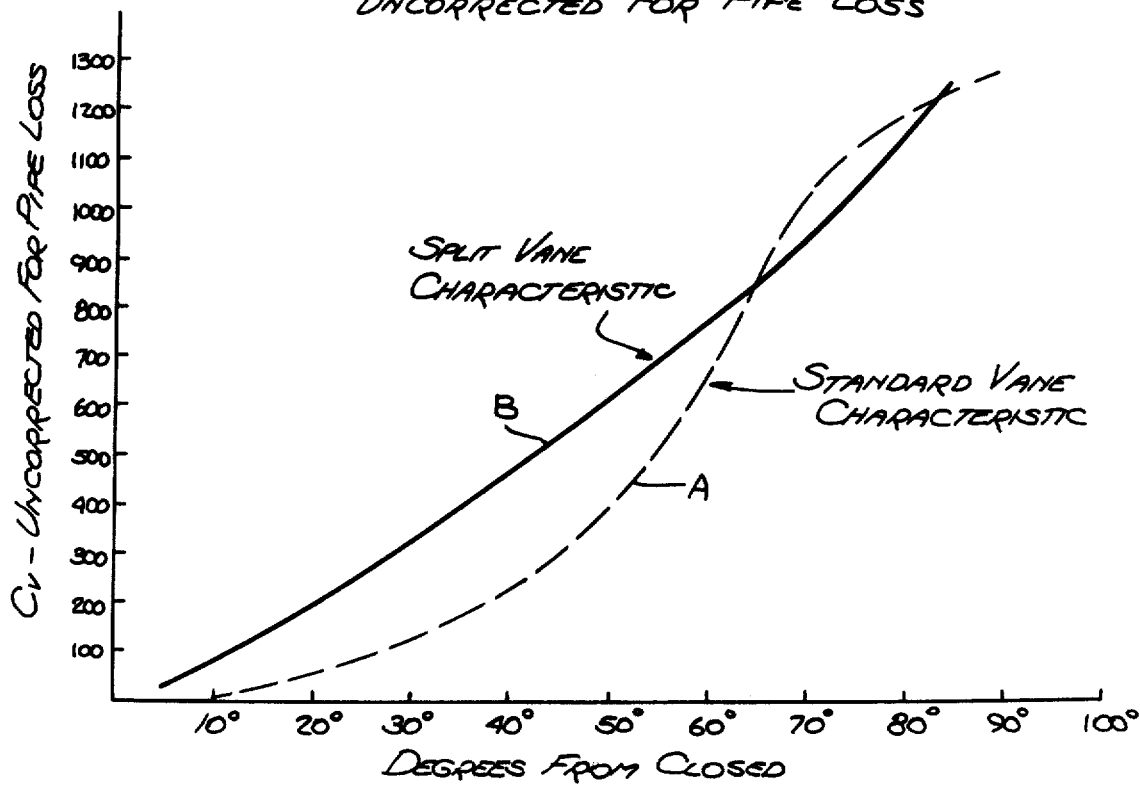

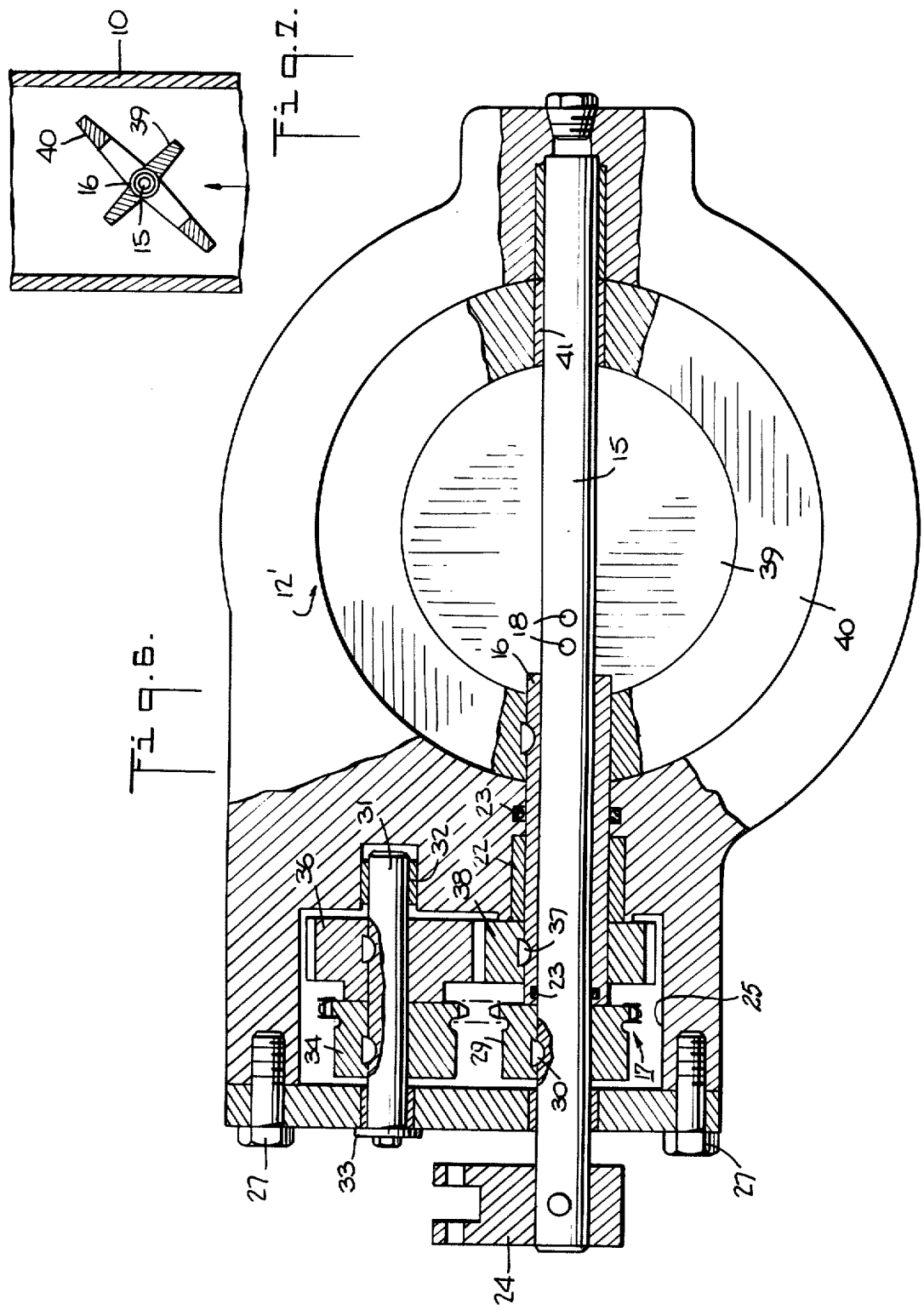

BUTTERFLY VALVE HAVING A SPLIT VANE

This invention relates to a butterfly valve having a split vane.

Heretofore, butterfly valves have been known to utilize a butterfly vane which is rotatable between an open 90° position parallel to the flow and a closed 0° position substantially perpendicular to the flow. In the open position, the vane is parallel to the fluid flow while in the closed position, the vane is at right angles to the stream. As is known, a torque is imposed upon the vane by the fluid flow when the vane is not in the fully open or closed position. That is, there is a torque on the vane when it is in any position other than 0° or 90°. As is known, the amount of torque changes sharply as the vane is pivoted from the open 90° position towards the closed 0° position. It is further known that the torque increases rapidly with sharp gradients between the 50° position and the 75° position; from 70° to 90°, the torque decreases sharply to near zero. In the past, these closing torques and sharp gradients have been overcome and stabilized by the use of large actuators and stiff springs. It has also been known that the sharp gradients in the torque curve cause difficulty in valve positioning at angles greater than 60°. The problem is further complicated by the inherent flow characteristic of a conventional vane between 50° and 70° since the rate of change of $C_v$ verses stroke at these angles is roughly twice the values at lower angles. This in combination with the position errors arising from abrupt torque changes, make throttling or modulating control impractical. The present method of handling this is to limit vane travel to 60° for throttling applications. This limits rated $C_v$ (at 60°) to about 50% of that for 90° operation.

It is also further known that the present construction of butterfly valve vanes have inherently low values of recovery coefficients (Km). This can lead to severe cavitation in many applications.

It has also been known to construct throttle valves with segmental vanes which are separably mounted on rotatable shafts. For example, it has been known to construct a vane with two semi-circular vanes which are mounted upon oppositely rotatable shafts which serve to fold the vanes toward each other in order to vary the opening of the valve. In such cases, when the vanes are in the fully open position, the vanes are folded over on each other so that a flow passes to either side of the vanes in a substantially uniform manner. In these cases, the torque imposed upon each vane by the fluid flow during an opening operation has been counteracted by the actuator. Further, since there are two unbalanced vanes, the actuator must be constructed to resist the large additive torque from the two vanes. Other butterfly valve vane constructions are known which utilize segmental portions. For example, in one case, the vane has been made up of two wings which are joined together for rotation as a single unit. In this case, both wings are connected to suitable actuators which are operated simultaneously. However, the wings are rotatable in the same direction such that the torque imposed upon the vane is similar to that imposed on a unitary vane.

Accordingly, it is an object of the invention to obtain a fluid dynamic torque balance on a butterfly vane of a butterfly valve.

It is another object of the invention to allow throttling control throughout 90° of operation of a butterfly valve.

It is another object of the invention to improve the cavitation characteristics of a butterfly valve.

It is another object of the invention to improve the flow characteristics of a butterfly valve.

Briefly, the invention provides a butterfly valve which utilizes a butterfly vane having a pair of discs mounted on a common axis with the axis passing transversely through each disc as well as a means for pivoting the discs simultaneously in opposite directions to each other about the common axis. The butterfly vane is mounted within a housing which defines an opening for a flow of fluid and is positioned so that the vane operates to selectively open and close the opening to the flow of fluid. The means for pivoting the discs of the vane includes a pair of shafts, one shaft being connected to one of the discs and the other shaft being connected to the other disc. In addition, the shafts are positioned coaxially and concentrically of each other so as to be rotated in opposite directions by means of a transmission connected between the shafts.

The transmission is connected between the shafts so that as one shaft is driven from an actuator in a suitable manner, the second shaft can be driven off the first shaft in an opposite direction. In this way, the respective discs of the butterfly vane rotate in opposite directions from a closed position to an open position and vice versa. When in the open position of the valve, both vanes are disposed at an angle of 0° with respect to the flow of fluid through the valve housing. In the closed position, both discs are disposed at an angle of 90° with respect to the flow of fluid to the housing.

The transmission between the two shafts can be of the gear and sprocket type or of any other suitable type, for example, one using gears or levers.

The discs of the butterfly vane are disposed so as to destroy the pressure distribution that produces closing torques normally transmitted to the actuator. Thus, the actuator need only supply sufficient power to overcome frictional losses instead of large dynamic torques plus friction.

The resulting reduction of the forces on the vane halves eliminates the sharp torque gradients that causes positioning difficulty in throttling at angles greater than 60°. Further, a capability is provided of throttling through 90°. This approximately doubles the $C_v$ of a modulating type of valve.

In one embodiment, the vane is made of a pair of semi-circular discs with each representing one-half of the overall vane. This split vane configuration of the butterfly vane presents four flow paths in any intermediate position. This doubles the number of flow streams and along with the cross-fly produced by the split, significantly improves recovery coefficients (Km).

The additional low angle $C_v$ gained by the split straightens the flow curve and gives the valve an improved characteristic for control and positioning at intermediate angles.

Instead of using a split vane, concentric vanes of the reduced trim style can also be used. In addition, a non-symmetrical splitting of the vane can be used to intentionally produce some small amount of torque for purposes such as backlash elimination, aid to the actuator and the like.

These and other objects and advantages of the invention will become more apparent from the following detailed description and appended claims taken in conjunction with the accompanying drawings in which:

FIG. 1 illustrates a cross-sectional view of a butterfly valve utilizing a vane according to the invention;

FIG. 2 illustrates a schematic view of a butterfly valve of FIG. 1 in a closed position;

FIG. 3 illustrates a view similar to FIG. 2 of the valve in a slightly opened position;

FIG. 4 graphically illustrates the $C_v$ characteristic of a standard vane butterfly valve and a valve according to the invention;

FIG. 5 graphically illustrates the choked flow curves of a standard butterfly valve and a valve according to the invention;

FIG. 6 illustrates a view of a modified vane according to the invention; and

FIG. 7 illustrates the vane of FIG. 6 in a partially opeened position.

Referring to FIG. 1, the butterfly valve has a housing 10 which defines an opening 11 for the passsage of a fluid flow. The housing is mounted in any suitable environment, such as in a pipeline (not shown) in order to control the flow through the pipeline.

The valve also has a butterfly vane 12 mounted within the opening 11 of the housing 10. This vane 12 is sized to selectively open and close the opening 11 to a flow of fluid and is made up of a pair of semi-circular discs 13, 14 which are disposed in symmetrical relationship. These discs 13, 14 are sequentially mounted on a common axis with the axis passing transversely through each disc. As shown in FIG. 1, when closed, the discs 13, 14 define a line of separation therebetween which is disposed at a right angle to the common axis. In addition, a means is provided for pivoting these discs 13, 14 simultaneously in opposite directions to each other about the common axis. This means includes a pair of concentrically mounted shafts 15, 16 and a transmission means 17. One disc 13 is fixedly secured to the inner shaft 15 in a conventional manner such as by a pair of screws or rivets 18 and the other disc 14 is fixed to the outer shaft 16 in a similar manner. As shown, the first disc 13 has an enlarged portion 19 to fit about the second shaft 16 to permit independent pivoting with respect to the shaft 16.

The inner shaft 15 is rotatably mounted within suitable bushings or bearings 20 in the valve housing 10. The outer shaft 16 is mounted by means of a bushing or bearing 21 concentrically on the inner shaft 15 and is mounted in the valve housing 10 by means of a similar bushing or bearing 22. In order to seal the respective shafts against a flow of liquid out of the housing, suitable seals such as 0-rings 23 are provided between the shafts 15, 16 and between the housing 10 and the outer shaft 16. Other sealing means as are known can also be utilized.

The inner shaft 15 extends out of the housing 10 and carries a bifurcated link 24 in fixed manner. This link 24 is adapted to be connected to a suitable actuator (not shown) in order to permit pivoting of the inner shaft 15.

The transmission 17 is mounted within a recess 25 formed in the valve housing 10. This recess 25 is covered over by a suitable plate 26 which is secured to the housing 10 by bolts 27. The cover 26, in the case shown, has a flange thereon containing an opening 28 for the passage of a lever or link (not shown) for a connection between the actuator (not shown) and the link 24.

The transmission 17 includes a sprocket 29 which is fixedly mounted on the inner shaft 15 by means of a key and slot arrangement 30. In this way, the sprocket 29 is able to pivot with the shaft 15. In addition, the transmission 17 includes a stub shaft 31 which is pivotally mounted within suitable bearing 32 one of which is mounted in the valve housing 10 and the other of which is mounted in the cover 26 and retained in place by a retainer plate 33 secured to the shaft 31 by bolts. This stub shaft 31 carries a sprocket 34 which is keyed to the shaft by a key and slot arrangement 30. The sprocket 34 is operatively connected to the sprocket 29 by means of a chain 35 so that the stub shaft 31 is able to follow the rotation of the inner shaft 15. The stub shaft 31 also carries a gear 36 which is keyed to the stub shaft 31 by a suitable key and slot arrangement 37. This gear 36 meshes with a second gear 38 which is fixedly mounted on the outer shaft 16 by a suitable key and slot arrangement 37. In this way, the outer shaft 16 is caused to rotate in an opposite direction from the stub shaft 31 in response to rotation of the stub shaft 31.

The transmission 17 is such that the shafts 15, 16 are rotated simultaneously in opposition to each other to move the discs 13, 14 between respective closed positions and open positions thereo. That is as the inner shaft 15 is rotated in one direction via the actuator (not shown) and the link 24, the outer shaft 16 is caused to rotate in the opposite direction.

In operation, assuming that the vane 12 is in the closed position as shown in FIGS. 1 and 2, should the actuator cause the link 24 to rotate, the inner shaft 15 causes one disc 13 to pivot towards an open position while the outer shaft 16 causes the other disc 14 to rotate in an opposite direction towards the open position as shown in FIG. 3.

As the butterfly valve is opened or throttled, the fluid flow is able to follow a number of flow paths. That is, a portion of the flow passes over each of the discs to both sides of the disc so that four flow paths are formed. Also, a portion of the flow passes in the space defined by the flat edges of the discs to establish a cross-flow pattern. During this time, the torque imposed on each disc by the fluid flow is reduced to near zero by the cross-flow and turbulence induced by the split. As a result, the total force required by the actuator to open or close the valve need only be slightly greater than that needed to overcome the frictional losses in the valve construction.

When the valve is moved from a fully opened position to a fully closed position, sharp torque gradients that might cause positioning difficulty are eliminated at angles greater than 60°. This is due to the balancing of the torque on the two discs 13, 14 of the vane. As a result, a valve can be throttled reliably through 90°. This approximately doubles the $C_v$ in a modulating type valve.

Further, the low angle $C_v$ obtained by the split vane construction not only straightens the flow curve but also allows the valve to have an improved characteristic for control and positioning at angles greater than 60°. As shown in FIG. 4, from tests carried out on a standard vane butterfly valve, the $C_v$ characteristic was found to follow the curve A while from the same tests, the $C_v$ characteristic of the split vane valve 10 was found to follow the curve B. The curves A, B are each plotted with the abscissa representing the degrees of opening from the closed valve position and the ordinate representing the $C_v$ characteristic uncorrected for pipe loss.

As is known, the recovery coefficient Km is a dimensionless ration that gives an indication of choked flow for gas or cavitation for liquids. The recovery coefficient consists of the ratio of the valve pressure drop squared divided by the upstream pressure at the pressure drop where deviation from the square root formula is evident. FIG. 5 graphically illustrates the respective hypothetical choked flow curves C, D for a 300 pound inlet on a standard butterfly vane and a split vane as described above. The standard vane has two flow paths while the split vane has four flow paths. Each curve C, D is plottted against an abscissa representing the square root of the valve pressure drop and an ordinate representing the flow in gallons per minute. For the curve C, the deviation of the pressure drop from the square root ratio occurs at about 8.5 psi. This gives a recovery coefficient of $8.5^2/300$, or 0.24. For the curve D, the deviation occurs at about 12 psi, giving a recovery coefficient of $12^2/300$ or 0.48. Greater numbers of flow paths and more direction changes would give larger ratios and more favorable coefficients at intermediate strokes.

It is to be noted that any suitable type of transmission means may be used to rotate the semi-circular discs of the vane in opposition to each other. For example, instead of using a gear and sprocket arrangement, use may be made of gears only or of levers only.

In the embodiment shown in FIGS. 1 to 3, the semi-cylindrical disc portions are substantially symmetrical. However, the discs may be made in a non-symmetrical relationship so that more torque is imposed on one discs than the other. This can be of use where a small amount of torque is required in order to eliminate backlash or to aid the actuator in operating the valve.

Referring to FIG. 6, wherein like reference characters indicate like parts as above, the vane 12' can also be made up of a pair of circular concentric discs 39, 40. As above, both discs 39, 40 are mounted on a common axis with the inner disc 39 secured to an inner shaft 15 and the outer apertured disc 40 secured to an outer shaft 16. The outer disc 40 is also journalled on the inner shaft 15 by a bearing 41 such as a sleeve bearing at the side opposite the transmission side. The transmission means 17 is similar to that described above and the operation of the vane 12' is similar to that described above. That is, as shown in FIG. 7, as the vane 12' is moved between the fully open position and fully closed position, the two vanes 39, 40 move in opposite directions such that a number of flow paths are formed.

In some instances, the valve can be constructed so that one portion of the vane will move before the other portion. For example, referring to the concentric vane configuration of FIGS. 6 and 7, the inner disc 39 can be allowed to move from the 0° position first.

What is claimed is:
1. A butterfly valve comprising
 a housing defining an opening for a flow of fluid;
 a butterfly vane mounted in said housing to selectively open and close said opening to a flow of fluid, said vane including a pair of discs; and
 means for pivoting said discs, said means including a first shaft connected to one of said discs for pivoting said discs in a first direction, a second shaft connected to the other of said discs and positioned coaxially of said first shaft for pivoting said other disc in a second direction opposite said first direction, and a transmission connected to said shafts to rotate said shafts simultaneously in opposite directions to move said discs between respective closed positions and open positions thereof.

2. A butterfly valve as set forth in claim 1 wherein each disc is of semi-circular shape.

3. A butterfly valve as set forth in claim 2 wherein said discs define a line of separation therebetween when closed which is disposed at a right angle to said common axis.

4. A butterfly valve as set forth in claim 1 wherein said discs are concentrically mounted with respect to each other.

5. A butterfly valve as set forth in claim 1 wherein said discs are mounted on a common axis.

6. A butterfly valve as set forth in claim 1 wherein said first shaft passes out of said housing for connection to a prime mover and said transmission includes a first sprocket fixedly mounted on said first shaft, a stub shaft rotatably mounted in said housing, a second sprocket fixedly mounted on said stub shaft, an endless chain connecting said sprockets to each other in drive relation for rotation of said stub shaft, a first gear fixedly mounted on said stub shaft, a second gear fixedly mounted on said second shaft and in meshing engagement with said first gear for rotating said second shaft in opposition to said first shaft.

7. A butterfly valve as set forth in claim 1 wherein said shafts are mounted in concentric relation.

8. A butterfly valve comprising
 a butterfly vane having a pair of semi-circular discs sequentially mounted on a common axis, said discs defining a line of separation therebetween when closed which is disposed at a right angle to said common axis, said axis passing transversely through each said disc; and
 means for pivoting said discs in opposite directions to each other about said common axis from a closed position to an open position.

9. A butterfly valve as set forth in claim 8 which further comprises a pair of concentrically mounted shafts rotatably mounted on said axis, each said shaft being connected to a respective disc, and wherein said means rotates said shafts in opposite directions.

10. A butterfly valve as set forth in claim 9 wherein said means includes a transmission between said shaft for rotating one of said shafts in opposition to the other of said shafts in response to rotation of said other shaft.

11. A butterfly valve as set forth in claim 8 which furthr comprises a first shaft connected to one disc and a second shaft connected to the other of said discs, said discs being sequentially arranged with respect to said common axis with said one disc having an enlarged portion disposed over one end of said second shaft.

12. A butterfly valve as set forth in claim 11 wherein said second shaft is rotatably mounted on said first shaft.

13. A butterfly valve as set forth in claim 8 wherein each disc is substantially symmetrical to the other disc.

* * * * *